(12) United States Patent
Li et al.

(10) Patent No.: US 8,064,877 B2
(45) Date of Patent: Nov. 22, 2011

(54) CHARGING METHOD AND NETWORK SYSTEM THEREOF, PACKET DATA NETWORK GATEWAY AND CHARGING SYSTEM THEREOF

(75) Inventors: Chun Li, Guangdong (CN); Mingjun Shan, Guangdong (CN); Jiao Kang, Guangdong (CN); Xin Shi, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/874,075

(22) Filed: Sep. 1, 2010

(65) Prior Publication Data

US 2010/0318448 A1    Dec. 16, 2010

Related U.S. Application Data

(63) Continuation of application No. 12/710,235, filed on Feb. 22, 2010, which is a continuation of application No. PCT/CN2008/071820, filed on Jul. 30, 2008.

(30) Foreign Application Priority Data

Aug. 20, 2007    (CN) .......................... 2007 1 0142034

(51) Int. Cl.
G06Q 10/00    (2006.01)
(52) U.S. Cl. ........................ 455/406; 455/408
(58) Field of Classification Search .................. 455/405, 455/406, 407; 370/230, 344, 338, 401
See application file for complete search history.

(56) References Cited

U.S. PATENT DOCUMENTS

| | | | |
|---|---|---|---|
| 6,226,364 B1 | 5/2001 | O'Neil | |
| 6,785,534 B2 | 8/2004 | Ung et al. | |
| 6,999,449 B2 | 2/2006 | Barna et al. | |
| 2004/0259527 A1 | 12/2004 | Lindberg | |
| 2008/0195511 A1 | 8/2008 | Zhang | |

(Continued)

FOREIGN PATENT DOCUMENTS

CN    1579087 A    2/2005

(Continued)

OTHER PUBLICATIONS

European Patent Office, Extended European Search Report in European Patent Application No. 08783813.2 (Jul. 26, 2010).

(Continued)

*Primary Examiner* — Sam Bhattacharya
(74) *Attorney, Agent, or Firm* — Leydig, Voit & Mayer, Ltd.

(57) ABSTRACT

A charging process method, relating to communication network, is disclosed according to embodiments of the present invention. The method includes receiving a charging request containing a type of a second method when the method for a user equipment to access a packet data network gateway has been changed from a first method to the second method; performing, based on the charging request, charging control over the used service units in a charging mode corresponding to the first method for the user equipment to access the packet data network gateway and reserving service units for the charging session for the second method based on a charging mode corresponding to the second method for the user equipment to access the packet data network gateway. A network system, a packet data network gateway and a charging system are provided according to embodiments of the present invention accordingly. Embodiments of the present invention can be applicable to a charging process in a situation when the method for a user equipment to access the packet data network gateway changes.

17 Claims, 5 Drawing Sheets

U.S. PATENT DOCUMENTS

2008/0320564 A1 12/2008 Duan
2009/0005006 A1 1/2009 Zhang

FOREIGN PATENT DOCUMENTS

| | | |
|---|---|---|
| CN | 1848895 A | 10/2006 |
| CN | 1921399 A | 2/2007 |
| CN | 1937632 A | 3/2007 |
| CN | 1996859 A | 7/2007 |
| CN | 101127629 A | 2/2008 |
| CN | 101730041 A | 6/2010 |
| EP | 1191776 A2 | 3/2002 |
| EP | 1526678 A1 | 4/2005 |
| EP | 1571802 A1 | 9/2005 |
| EP | 1732264 A1 | 12/2006 |
| EP | 1804419 A1 | 7/2007 |
| WO | WO 02/17561 A2 | 2/2002 |
| WO | WO 2007/048336 A1 | 5/2007 |
| WO | WO 2007/087267 A2 | 8/2007 |
| WO | WO 2009/078874 A1 | 6/2009 |
| WO | WO 2009/100669 A1 | 8/2009 |
| WO | WO 2010/014088 A1 | 2/2010 |

OTHER PUBLICATIONS

Global System for Mobile Communications, "Study on Charging Aspects of 3GPP System Evolution," $3^{rd}$ Generation Partnership Project; Technical Specification Group Services and System Aspects; Telecommunication Management; 3GPP TR 32.820 V0.3.0 (Jun. 2007) XP50306091A1.

State Intellectual Property Office of the People's Republic of China, International Search Report in International Patent Application No. PCT/CN2008/071820 (Oct. 23, 2008).

State Intellectual Property Office of the People's Republic of China, English Translation of Written Opinion of the International Searching Authority in International Patent Application No. PCT/CN2008/071820 (Oct. 23, 2008).

$1^{st}$ Office Action in corresponding Chinese Application No. 200710142034.4 (Jan. 12, 2011).

$1^{st}$ Office Action in corresponding European Application No. 08783813.2 (May 9, 2011).

"3GPP TS 32.252—3rd Generation Partnership Project; Technical Specification Group Service and System Aspects; Telecommunication management; Charging management; Wireless Local Area Network (WLAN) charging (Release 7)," Dec. 2006, Version 7.0.0, $3^{rd}$ Generation Partnership Project, Valbonne, France.

"3GPP TS 32.271—3rd Generation Partnership Project; Technical Specification Group Service and System Aspects; Telecommunication management; Charging management; Location Services (LCS) charging (Release 7)," Jun. 2007, Version 7.0.0, $3^{rd}$ Generation Partnership Project, Valbonne, France.

"3GPP TS 32.299—3rd Generation Partnership Project; Technical Specification Group Service and System Aspects; Telecommunication management; Charging management; Diameter charging applications (Release 7)," Sep. 2007, Version 7.7.0, $3^{rd}$ Generation Partnership Project, Valbonne, France.

CHARGING METHOD AND NETWORK SYSTEM THEREOF, PACKET DATA NETWORK GATEWAY AND CHARGING SYSTEM THEREOF

CROSS-REFERENCE TO RELATED APPLICATIONS

This application is a continuation of U.S. patent application Ser. No. 12/710,235 filed on Feb. 22, 2010, which is a continuation of International Application No. PCT/CN2008/071820, filed on Jul. 30, 2008, which claims priority to Chinese Patent Application No. 200710142034.4, filed on Aug. 20, 2007, all of which are hereby incorporated by reference in their entireties.

FIELD OF THE INVENTION

The present invention relates to communication network field, and more specifically to a charging process method and a network system thereof, a packet data network gateway and a charging system thereof.

BACKGROUND

Currently, with a further development of the communication network technology, operators are able to provide users with various services. For the service provided by the operators, user equipments (UE) may employ different access methods. Therefore, the operator may adopt different charging modes based on characteristics of different access methods. The charging modes generally include flow-based charging, time-based charging or event-based charging, etc. For instance, in a System Architecture Evolution (SAE) core network, if the UE adopts Evolved UMTS Terrestrial Wireless access Network (E-UTRAN) as an access method, the operator may adopt a flow-based charging mode. If the UE connects via a Wireless Local Area Network (WLAN), the operator may charge the user with a time-based charging mode.

A conventional charging framework for the SAE architecture may adopt E-UTRAN access method and WLAN access method.

For E-UTRAN access method, collection points for on-line charging are deployed at a Packet Data Network Gateway (PDN GW). The collection points gather from the PDN GW associated charging information about the bearer layer and report the charging information to an Online Charging System (OCS) for charging control, such as fee deduction.

For WLAN access method, the collection points for on-line charging may be deployed at an evolved Packet Data Gateway (ePDG), PDN GW or AAA server (3GPP AAA Server). These collection points gather charging information about the bearer layer associated with the WLAN and report the charging information to the OCS for charging control, such as fee deduction.

During researches and practices regarding the conventional art, it is discovered that according to conventional art, charging in the case of different access techniques is separately controlled in different charging architectures. When the user uses the service, if the access method changes, a current charging session has to be interrupted and switched to another charging architecture for charging control. Therefore, charging continuity in the case of a handover of the access method cannot be achieved.

SUMMARY

A charging process method, a network system, and a packet data network gateway are provided according to embodiments of the present invention. The charging process method, the network system, and the packet data network gateway allow for continuous charging when the method for a user equipment to access the PDN GW changes.

To solve the foregoing problem, technical solutions are presented below according to the present invention.

A charging process method is provided according to an embodiment of the present invention. The method includes:

monitoring if there is any change in a method for a user equipment to access a packet data network gateway; and sending to a charging system a charging request containing a type of a second method when it is detected that the method for the user equipment to access the packet data network gateway has been changed from a first method to the second method.

A charging process method is provided according to an embodiment of the present invention. The method includes:

receiving a charging request containing a type of a second method when a method for a user equipment to access a packet data network gateway has been changed from a first method to the second method; and performing, based on the charging request, charging control over the used service units in a charging mode corresponding to the first method for the user equipment to access the packet data network gateway and reserving service units for the charging session for the second method based on a charging mode corresponding to the second method for the user equipment to access the packet data network gateway.

A network system is provided according to an embodiment of the present invention. The network system includes a packet data network gateway, configured to send a charging request containing a type of a second method after the packet data network gateway detects that the method for the user equipment to access the packet data network gateway is changed from a first method to the second method; and a charging system, configured to receive the charging request sent by the packet data network gateway; perform, according to the charging request, charging control over the used service units in a charging mode corresponding to the first method for the user equipment to access the packet data network gateway; and reserve service units for a charging session for the second method based on a charging mode corresponding to the second method for the user equipment to access the packet data network gateway.

A packet data network gateway is provided according to an embodiment of the present invention. The packet data network includes a detecting unit, configured to monitor if there is any change in a method for a user equipment to access the packet data network gateway; and a charging request unit, configured to send to the charging system the charging request containing the type of the second method when it is detected that the method for the user equipment to access the packet data network gateway has been changed from the first method to the second method.

A charging system is provided according to an embodiment of the present invention. The charging system includes a receiving unit, configured to receive the charging request sent by the packet data network gateway, wherein the charging request contains the type of the second method for the user equipment to access the packet data network gateway; and a processing unit, configured to perform, based on the charging request received by the receiving unit, charging control over used service units in a charging mode corresponding to the first method for the user equipment to access the packet data network gateway and reserve service units for the charging session for the second method based on a charging mode corresponding to the second method for the user equipment to access the packet data network gateway.

As can be seen from the above technical solutions, in the conventional art, charging control in the case of different access techniques is performed separately in different charging architectures. When a handover of the access method is performed, the charging continuity during the handover of the access method cannot be achieved. However, the technical solutions according to the embodiments of the present invention take full advantage of the centralized control functions of the PDN GW and utilize the PDN GW to detect if the method for the UE to access the PDN GW has been changed. When it is detected that the method for the UE to access the PDN GW has been changed from a first method to a second method, the charging system sends a charging request containing a type of the second method. The charging system performs, based on the charging request, charging control over the used service units under a charging mode corresponding to the first method for the UE to access the PDN GW and reserves service units for the charging session of the second method based on the charging mode corresponding to the second method for the UE to access the PDN GW. Therefore, charging continuity during the handover of the method for the UE to access the PDN GW can be achieved.

DETAILED DESCRIPTION

A charging process method is provided according to an embodiment of the present invention. The method allows for charging continuity when the method for the user equipment to access the PDN GW changes.

Figure 1:
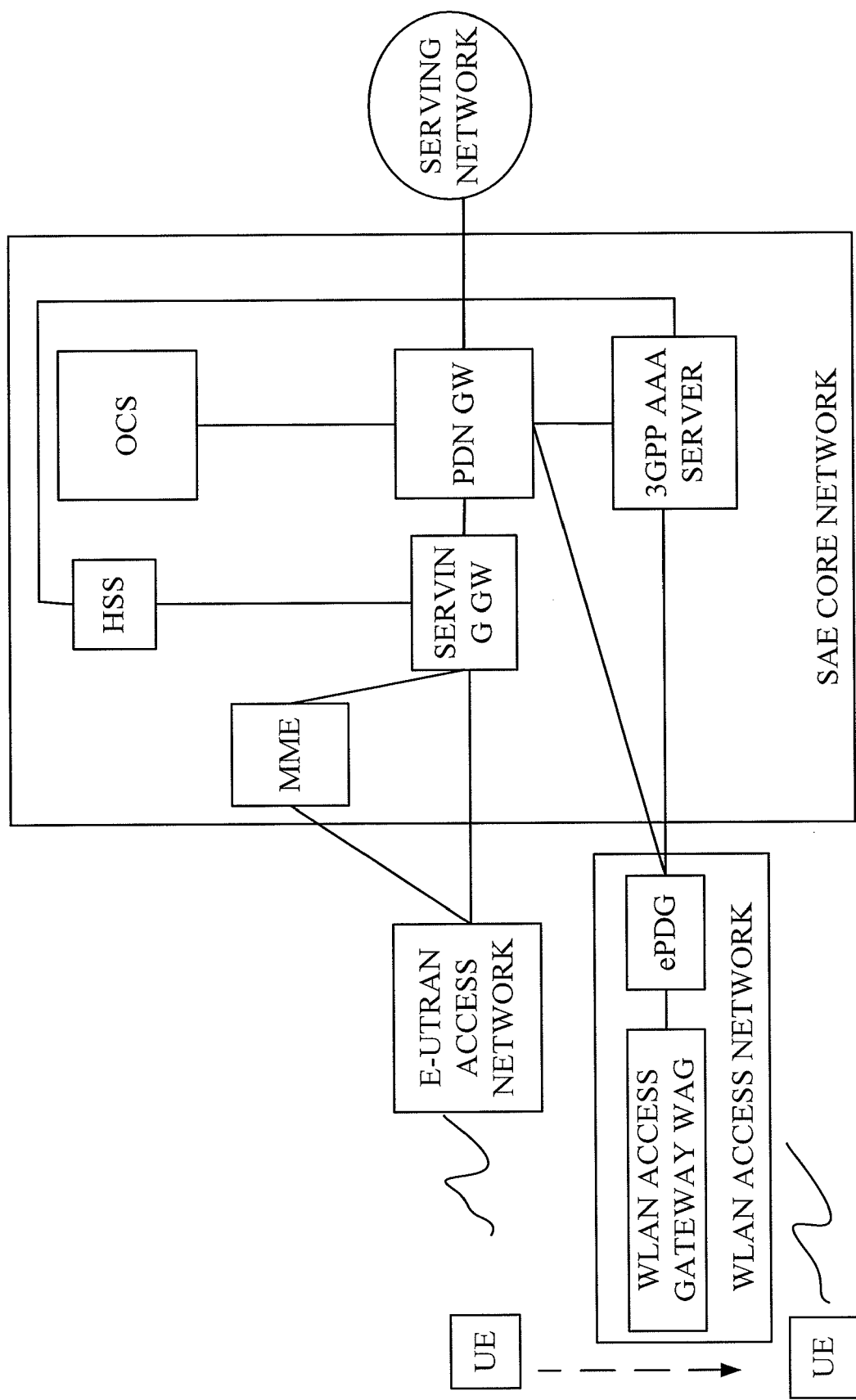
FIG. 1 is a block diagram of a charging architecture combining different access methods according to an embodiment of the present invention.

Before introducing the charging process method of the present invention, a charging architecture combining different access methods according to an embodiment of the present invention is first introduced. Referring to FIG. 1, a block diagram of a charging architecture combining different access methods according to an embodiment of the present invention is illustrated.

The charging architecture in FIG. 1 may guarantee charging continuity when a user equipment adopts a different access method to access the PDN GW. FIG. 1 includes an E-UTRAN access network, a Mobile Management Entity (MME), a Serving Gateway (Serving GW), a Home Subscriber Service (HSS), a Packet Data Network Gateway (PDN GW), an Online Charging System (OCS), a serving network (e.g., IMS network), a WLAN access network, an AAA server (3GPP AAA Server), wherein the WLAN access network includes a WAG and an ePDG. In FIG. 1, the collection points for online charging are collectively deployed at the PDN GW. Charging information about the bearer layer is gathered from the PDN GW and is reported to the OCS for charging control.

It should be noted that FIG. 1 is only an example where a handover between E-UTRAN and WLAN is performed. The handover between other access methods, such as from E-UTRAN access to 2G/3G access, can also be contemplated.

The SAE may support various access methods, including the second generation mobile communication network (2G) IP access/the third generation mobile communication network 3G IP access, E-UTRAN IP access and non-3GPP IP access. The non-3GPP IP access may be categorized into a trusted type and an untrusted type. The untrusted non-3GPP IP access performs access through an ePDG. The WLAN access belongs to the untrusted non-3GPP IP access. Meanwhile, the SAE supports a handover of the user equipment among various access methods. For example, in FIG. 1, a handover of the user equipment from E-UTRAN to WLAN is illustrated.

A brief introduction to the main function entities in the SAE architecture involved in FIG. 1 is provided below.

The Mobility Management Entity (MME) mainly handles mobility management including storing the context of UE control plane such as user ID (UEID), user status, tracking area (TA), performing mobility management, performing authentication and key management, encrypting signaling, protecting integrity, managing and allocating temporary user ID, etc. The MME is further responsible for controlling signaling interaction. The MME may interact with a Home Subscriber Server (HSS) and may be responsible for user ID authentication.

The Serving GW is mainly responsible for handling user plane data including routing and forwarding data, compressing data header, and storing the context of UE user plane. The context of UE user plane includes basic IP bearer information, routing information, etc. After the Serving GW establishes a bearer with the base station via the MME, the Serving GW is responsible for relaying and routing the user data packet.

The PDN GW is mainly responsible for handling user plane between systems, including handling switching between the user planes of different access systems, routing and forwarding data, collecting account data, implementing the function of the gateway for connecting to the Package Data Network (PDN). In SAE architecture, the PDN GW is responsible for core control. The operator controls various access methods via the PDN GW. Different accesses connect into the PDN GW via their respective access gateway device. As to 2G/3G access, a Serving GPRS Supporting Node (SGSN) is used for access to the Serving GW and thus connecting to the PDN GW. For E-UTRAN access, the Serving GW is used for connecting to the PDN GW. For WLAN access, the ePDG is used for connecting to the PDN GW. The centralized control function of the PDN GW allows the operator to manage different access techniques for connecting towards the mobile IP network.

The ePDG is mainly used in untrusted non-3GPP IP access. The untrusted non-3GPP IP access connects to the PDN GW via the ePDG. By interacting with the 3GPP AAA server, the ePDG authenticates and authorizes the untrusted non-3GPP IP access.

A charging process method is provided according to an embodiment of the present invention. The method introduces an additional parameter "SAE-Information" in the service information (Service-Info) of a charging request (Credit Control Request, CCR) and a charging request answer (Credit Control Answer, CCA). The SAE-Information parameter is illustrated in Table 1. In Table 1, the type of access method "SAE-RAT-Type" and the handover time "SAE-RAT-Handover-Time" are newly added according to the present embodiment.

TABLE 1

| Parameter | Application | Description |
| --- | --- | --- |
| SAE-Charging-ID | OC (optional to the operator) | PDP context identifier used to identify this PDP context in different charging records created by PDN GW. |
| SAE-PDP-Type | OM (mandatory to the operator) | PDP type, i.e. IP, PPP, or IHOSS: OSP. |
| PDP-Address | OC (optional to the operator) | This field holds the PDP address of the served IMSI, i.e. IPv4 or IPv6. This parameter shall be present except when both the PDP type is PPP and dynamic PDP address assignment is used. |
| SAE-GPRS-Negotiated-QoS-Profile | OC (optional to the operator) | This field holds the QoS profile applied by PDN GW. |
| Served-IMSI | M (Mandatory) | IMSI of the served party. |
| MME-Address | M (Mandatory) | Identify the address of MME |
| Serving GW-Address | M (Mandatory) | Identify the address of Serving GW |
| PDN GW-Address | M (Mandatory) | Identify the address of PDN GW |
| ePDG-Address | OC (Optional to the operator) | Identify the address of ePDG |
| SAE-IMSI-MCC-MNC | OC (Optional to the operator) | This field holds the MCC and MNC extracted from the user's IMSI (first 5 or 6 digits, as applicable from the presented IMSI). |
| SAE-PDN GW-MCC-MNC | OC (Optional to the operator) | This field holds the MCC-MNC of the network the PDN GW belongs to. |
| SAE-NSAPI | OC (Optional to the operator) | This field Identifies a particular PDP context for the associated PDN and MSISDN/IMSI from creation to deletion. |
| Called-Station-ID | OC (Optional to the operator) | This field contains the identifier of the access point (APN) the user is connected to. |
| SAE-Session-Stop-Indicator | OC (Optional to the operator) | This field indicates to the OCS that the last PDP context of a session is released and that the PDP session has been terminated. |
| CG-Address | OC (Optional to the operator) | This field holds the Charging Gateway IP address. |
| SAE-Selection-Mode | | UE-only, UE/NW or NW-only |
| 3GPP-Charging-Characteristics | OC (Optional to the operator) | This field contains the charging characteristics for this PDP Context received in the Create PDP Context Request Message |
| Charging-Rule-Base-Name | OC (Optional to the operator) | This field indicates the name of a pre-defined group of PCC rules residing at the PCEF. It may occur several times within the PS Information field. |
| SAE-User-Location-Info | OC (Optional to the operator) | Tracking Area Identifier |
| SAE-RAT-Type | OC (Optional to the operator) | This field identifies the type of wireless access technique, which may be 3G, 2G E-UTRAN, WLAN, Wimax, etc |
| SAE-RAT-Handover-Time | OC (Optional to the operator) | This field holds the handover time that the method for accessing the PDN GW changes. |

Figure 2:
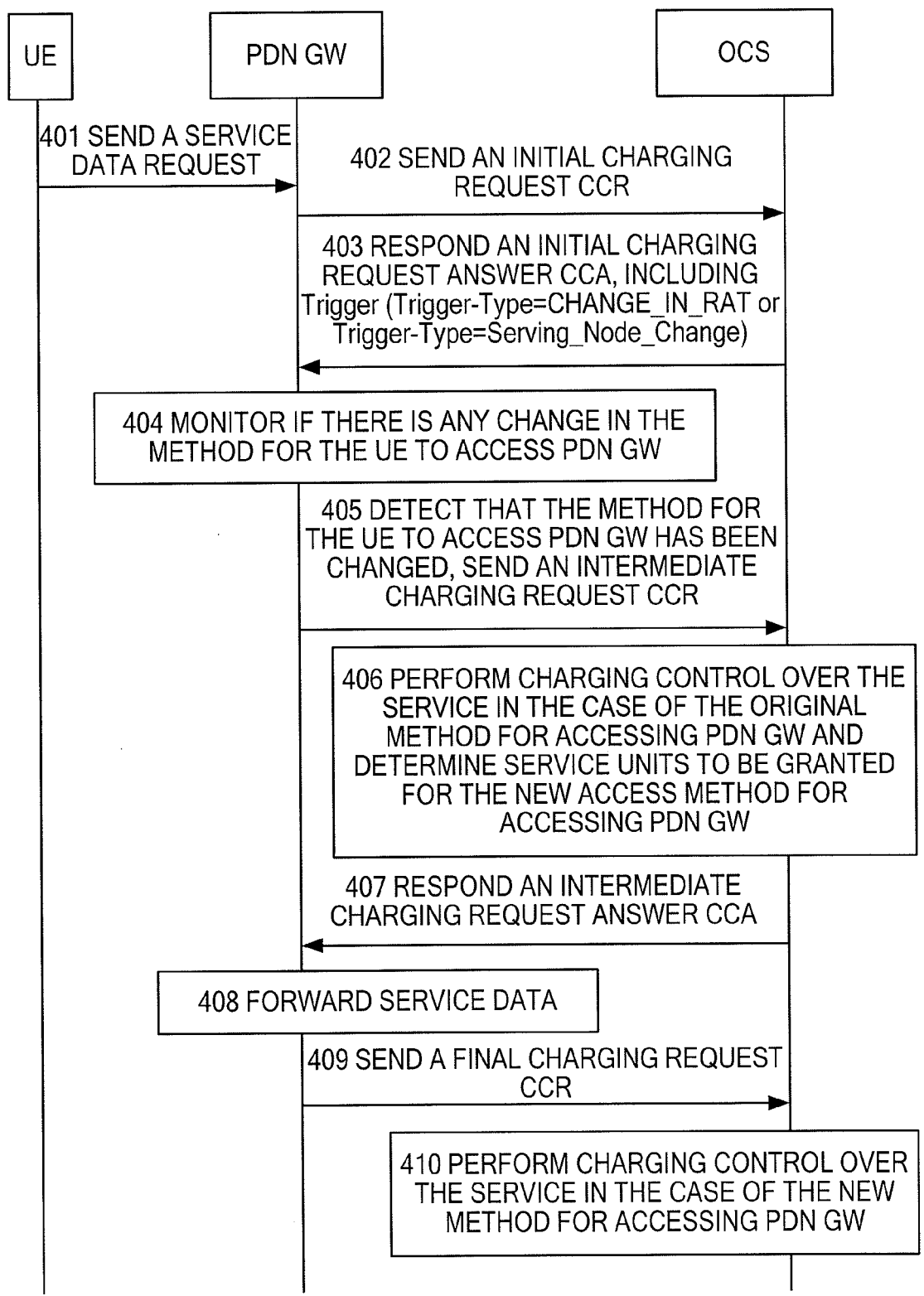
FIG. 2 is a flowchart of a charging process method according to an embodiment of the present invention.

FIG. 2 is a flowchart of a charging process method according to an embodiment of the present invention. The method includes the following steps.

401: The PDN GW receives a service data request from the UE.

402: The PDN GW sends an initial charging request to the OCS. The initial charging request includes a type of an access method for the UE to access the PDN GW and/or requested service units in the case of this access method.

403: The OCS returns an initial charging request answer to the PDN GW. The initial charging request answer includes the service units allocated for the service in the case of this access method for the UE to access the PDN GW and a new condition for triggering an intermediate charging request is set, wherein the condition is that the access method for the UE to access the PDN GW changes.

The access method for the UE to access the PDN GW is determined to be changed when a change in the wireless access method is detected (Trigger-Type=CHANGE_IN_RAT) and/or when a change in the Serving node is detected (Trigger-Type=Serving_Node_Change). The wireless access method is determined to be changed when a handover among the WLAN, E-UTRAN and 2G/3G wireless accesses is performed. The serving node may be a Serving GW or an ePDG.

404: The PDN GW monitors if there is any change in the method that the UE connects to the PDN GW after the PDN GW receives an initial charging request answer.

405: After the PDN GW detects that the method for the UE to access the PDN GW has been changed from a first method to a second method, the PDN GW sends an intermediate charging request to the OCS. The intermediate charging request includes the service units used by the UE in the case of the first method, i.e., the previous method for accessing PDN GW, and includes a type of the second method, i.e., the new method for accessing PDN GW.

In addition, the intermediate charging request may further include the service units requested by the UE in the case of the new method for accessing PDN GW and the handover time of switching to the new method for accessing PDN GW.

406: The OCS extracts from the intermediate charging request the service units used by the UE in the case of the previous method for accessing the PDN GW, performs a charging control, and reserves service units for a service in the case of the new method for accessing the PDN GW, i.e., determines the service units to be allocated.

The OCS performs charging control based on the service units which have been used in the case of the previous method for accessing PDN GW and is indicated in the intermediate request. For instance, the charging control may include fee deduction, other operation, etc. The OCS then determines service units to be allocated for the service in the case of the type of the new method for accessing PDN GW according to the type of the new method for accessing PDN GW in the charging request. When the charging mode varies with a different access method, the service units need to be converted based on the rating, for instance, from flow-based mode to time-based mode. It should be noted that if the intermediate charging request does not contain the service units used in the case of the previous method for accessing PDN GW, it is generally believed that the amount of the used service units is zero.

If the intermediate charging request further includes the service units requested in the case of the new method for accessing PDN GW, the OCS determines service units to be allocated for a service in the case of the new method for accessing PDN GW based on the requested service units, the used service units in the case of the previous method for accessing PDN GW and the account balance associated with the UE in the data base. If it is discovered, after the service in the case of the previous method for accessing PDN GW was charged for, that the remaining service units obtained by subtracting the used service units in the case of the previous method for accessing PDN GW from the UE's user account are less than the requested service units, a reverse calculation is conducted on the remaining service units according to the operator's charging policy for the service. Then, the quotas of the service units that can be actually allocated are determined. Or, if it is discovered that the remaining service units obtained by subtracting the used service units in the case of the previous method for accessing PDN GW from the UE's user account are not sufficient for supporting the UE to use the service continuously, no more service units will be allocated to UE and the service serving the UE will be interrupted.

If the charging request further includes the handover time when a handover of the method for accessing PDN GW is performed, the OCS takes this handover time as a reference point for performing a charging control over the service in the case of the pervious method for accessing PDN GW and for determining the service units to be allocated in the case of the new method for accessing the PDN GW.

407: The OCS returns an intermediate charging request answer to the PDN GW. The intermediate charging request answer includes the service units to be allocated in the case of the new method for accessing PDN GW.

408: The PDN GW delivers service data in the case of the new method for accessing PDN GW.

409: After the service serving the UE is completed, the PDN GW sends a final charging request to the OCS. The final charging request includes the service units used by the user in the case of the new method for accessing PDN GW.

410: The OCS extracts from the final charging request the service units used by the user in the case of the new method for accessing PDN GW and performs charging control.

It should be noted that online charging procedure is illustrated as an example of the charging process method according to the present embodiment. However, the present embodiment is not limited in this respect. This solution may also be applicable to an offline charging procedure. Offline charging has no effect on the process of using the service. When the PDN GW reports the charging request to an offline charging system, the charging request may not need to include the requested service units and the offline charging system may not need to determine the service units to be allocated to the service serving the UE. During offline charging, the PDN GW may also monitor if there is any change in the method for the UE to access PDN GW. When the PDN GW detects that the method for the UE to access PDN GW changes, the PDN GW sends an intermediate charging request to the offline charging system. The intermediate charging request includes service units used by the UE in the case of the previous method for accessing PDN GW and the type of the new method for accessing PDN GW. After the UE terminates the service in the new method of accessing the PDN GW, the PDN GW sends a final charging request to the offline charging system. The final charging request includes the service units used by the user in the case of the new method for accessing PDN GW. The offline charging system may perform charging control based on the received used service units in the case of the two methods for accessing PDN GW.

Figure 3:
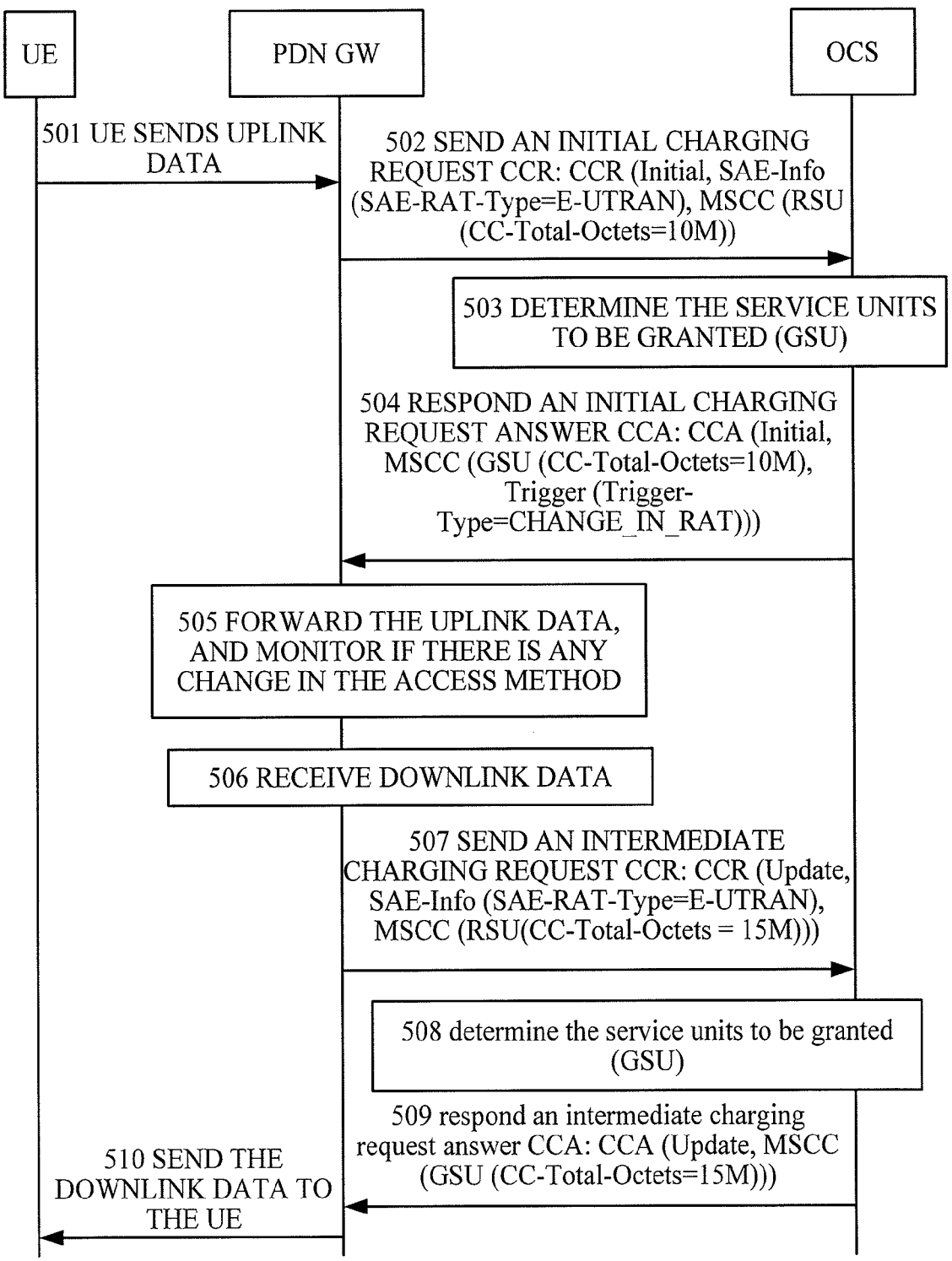
FIG. 3 is a flowchart of a charging process method after the UE sets up an E-UTRAN connection according to an embodiment of the present invention.

FIG. 3 is a flowchart of a charging process method after the UE sets up an E-UTRAN connection according to an embodiment of the present invention.

501: The UE sends uplink data.

After the UE sets up an E-UTRAN connection, the UE sends the uplink data.

The procedure for the UE setting up the E-UTRAN connection is described as follows. The UE sends an Attach request to the MME via eNodeB and performs authentication at HSS via the MME. After receiving the Attach request, the MME sends a Create default bearer request to the PDN GW via the Serving GW and receives a Create default bearer response from the PDN GW. Then, the MME sends an Attach response to the eNodeB. The eNodeB subsequently sends a Create wireless bearer layer request to the UE. When receiving a Create wireless bearer layer response from the UE, the eNodeB returns a bearer layer setup complete response to the MME.

502: After the PDN GW receives a service request sent by the UE, the PDN GW sends an initial charging request (CCR) to the OCS. The initial charging request includes a type of the access method indicated by "SAE-Information" (e.g., SAE-RAT-Type=E-UTRAN) and requested service units (e.g., RSU=10M).

503: After the OCS receives the initial charging request, the OCS performs online charging control and determines the service units to be allocated (e.g., GSU=10M) based on the account balance associated with the UE in the data base.

504: The OCS sends an initial charging request answer (e.g., CCA) to the PDN GW. The initial charging request answer includes the allocated service units (e.g., GSU=10M) and a new condition for triggering the intermediate request is set when the method for the UE to access PDN GW changes (Trigger-Type=CHANGE_IN_ART).

505: The PDN GW may forward the uplink data and monitor if there is any change in the method for the UE to access the PDN GW after the PDN GW receives the initial charging request answer.

506: The PDN GW receives the uplink data.

After the PDN GW receives an update bearer layer request from the MME, the PDN GW sends an update bearer layer request answer to the MME. Meanwhile, the PDN GW receives the downlink data.

507: The PDN GW sends an intermediate charging request (CCR) to the OCS. The request includes a type of the access method indicated by "SAE-Information" (e.g., SAE-RAT-Type=E-UTRAN) and requested service units (e.g., RSU=15M).

508: After the OCS receives the intermediate charging request, the OCS performs online charging control and determines the service units to be granted (e.g., GSU=15M) based on the account balance associated with the UE in the database.

509: The charging system returns an intermediate charging request answer (CCA) to the PDN GW. The request includes the service units to be granted (GSU=15M).

510: The PDN GW sends the downlink data to the UE.

Figure 4:
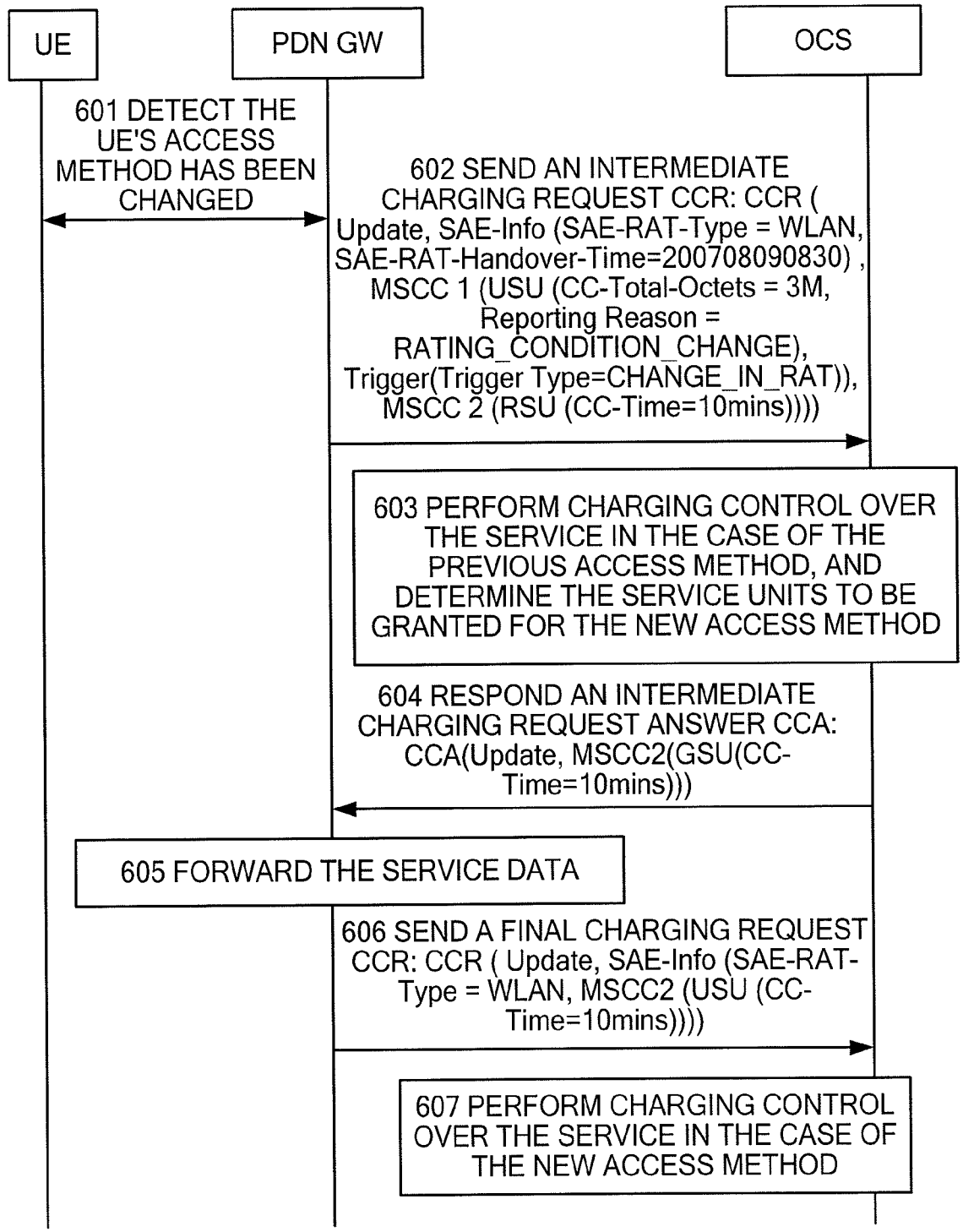
FIG. 4 is a flowchart of a charging process method when handover is performed from the E-UTRAN to the WLAN according to an embodiment of the present invention.

FIG. 4 is a flowchart of a charging process method when a handover is performed from the E-UTRAN to the WLAN according to an embodiment of the present invention. The method includes the following steps.

601: The UE accesses the WLAN. The PDN GW detects a change of the wireless access method.

A handover of the UE from E-UTRAN to WLAN can be performed while the uplink data and the downlink data are under transmission and the charging session between the PDN GW and the OCS is going on. The handover procedure is performed as follows. The UE performs authentication at 3GPP AAA server and HSS via the ePDG. The HSS then updates routing information and the ePDG sends an update bearer layer request to the PDN GW and receives an update bearer layer request answer from the PDN GW. Then, a data tunnel is set up between the ePDG and the PDN GW and a data tunnel is also set up between the ePDG and the UE. Thus, transmission of uplink data and downlink data can be achieved between the UE and the PDN GW. In other words, after the wireless access method changes, the UE may now connect to the PDN GW via ePDG, which would otherwise connect to the PDG GW via the Serving GW. Meanwhile, the PDG GW detects that the wireless access method has been changed.

602: The PDG GW sends an intermediate charging request (CCR) to the OCS. The charging request may include a type of the service access method indicated by "SAE-Information" (e.g., SAE-RAT-Type=WLAN) and a handover time when a handover of the method for accessing PDN GW is performed, e.g. SAE-RAT-Handover-Time=200708090830 (08:30, Aug. 9, 2007). The request may also include the used service units (USU=3M) in the Multiple-Services-Credit-Control parameter (MSCC 1) in the case of E-UTRAN access, reason for reporting used service units (Reporting Reason=RATING_CONDITION_CHANGE), reason for triggering reporting used service units (Trigger-Type=CHANGE_IN_RAT). For WLAN access method, the requested service units in MSCC2 is RSU=10 mins.

603: The OCS performs an online charging control, performs charging control over the original wireless access method, and determines allocated service units for the new access method.

After the OCS receives the intermediate charging request (CCR), the OCS extracts used service units (USU) in the case of E-UTRAN access and performs charging control over the service in the case of E-UTRAN access. If the used service units (USU) are less than the GSU allocated to the service previously, the UE will be compensated. That is, the service units of GSU minus USU are compensated to the UE. The OCS further extracts information such as UE's new wireless access method (SAE-RAT-Type=WLAN) and the requested service units RSU in the MSCC2 in the case of WLAN access and determines the service units to be allocated to the service in the case of WLAN access. As the charging modes for E-UTRAN access and the WLAN access are different, that is, the charging mode for the E-UTRAN access is flow-based while the charging mode for WLAN access is time-based, there is a need to convert the service units from flow-based charging mode to time-based charging mode based on the rating. The OCS performs charging control over the service in the case of the original access method and allocates the service units for the service in the case of the new access method based on reference point according to the handover time. The handover time refers to the time when a handover of the method for accessing PDN GW is performed. It should be noted that flow-based and time-based charging modes are illustrated as examples of the charging mode. Alternatively, the charging can also be performed on an event basis.

604: The OCS sends an intermediate charging request answer (CCA) to the PDN GW. The intermediate charging request answer includes the service units determined to allocated in the MSCC2 in the case of the WLAN (e.g., GSU=10 mins).

605: The PDN GW forwards the service data (uplink data or downlink data).

606: After the service serving the UE is completed, the PDN GW sends a final charging request (CCR) to the OCS. The final charging request includes the service units used by the user (e.g., USU=10 mins) in the case of the WLAN access after a handover of the access method.

607: The OCS extracts from the final charging request (CCR) the service units used by the user in the case of WLAN access and performs charging control.

It should be noted that the above description takes a handover from the E-UTRAN to WLAN as an example. The principle may also be applied to the handover from WLAN to E-UTRAN.

Further, as mentioned before, the PDN GW may monitor if there is any change in the method for UE to access the PDN GW. The access method for the UE to access the PDN GW is determined to be changed when a change in the wireless access method is detected and/or a change in the Serving node is detected. When a handover among the E-UTRAN, WLAN and 2G/3G access methods is performed, the wireless access method is changed and thus the method for UE to access the PDN GW is changed. However, the serving node between the UE and the PDN GW might or might not be changed. For instance, when a handover from the E-UTRAN to 2G/3G is performed, the wireless access method is altered whereas the Serving GW connecting to the PDN GW might be altered or might not be altered. Although the Serving GW connecting to the PDN GW is constant, the wireless data tunnel still needs to be re-established and the Serving GW needs to notify the PDN GW since the access method is changed from E-UTRAN to 2G/3G. Therefore, the PDN GW detects that the UE's access method has been changed. The procedure is described as follows. The UE interacts data with the PDN GW via Serving GW in the case of E-UTRAN access. At that time, the UE is ready to connect to the 2G/3G network environment. Then, the UE requests an access authentication from the target SGSN. The SGSN may perform authentication with the HSS via Serving GW/MME. After the authentication is passed, the UE may establish a data tunnel with the target SGSN and the target SGSN establishes a data tunnel with the Serving GW. Then, the Serving GW may update the data tunnel with the PDN GW and send to the PDN GW information indicating that the UE access method has been changed. Thus, the PDN GW detects that UE wireless access method has been changed.

Another instance is that the wireless access method has not been changed, but the Serving GW connecting to the PDN GW has been changed. For example, during roaming, the UE may switch between different Serving GWs in the case of a same access method. In this case, the PDN GW may consider that the method for the UE to access PDN GW has been changed. The procedure is described as follows. The UE interacts data with the PDN GW via Serving GW. When the UE roams to the target Serving GW network environment, the UE requests an access authentication from the target Serving GW. The target Serving GW may perform authentication with the HSS via PDN GW. After the authentication is passed, the UE may establish a data tunnel with the target Serving GW. The target Serving GW may update the data tunnel with the PDN GW and send to the PDN GW information indicating that the access method for the UE to access PDN GW has been changed. Thus, the PDN GW detects that the method for the UE to access PDN GW has been changed.

It is appreciated by those skilled in the art that the entire or partial procedures in the above embodiments can be implemented in hardware when instructed by programs. Such programs may be stored in a computer or in a readable storage media. The program, when executed, may include the procedures described in the above various embodiments. The storage media may be a magnetic disc, an optic disc, a Read-Only Memory (ROM) or a Random Access Memory (RAM), etc.

The above description introduces a charging process method according to an embodiment of the present invention. A network system, a packet data network gateway and a charging system thereof are also provided according to embodiments of the present invention.

Figure 5:
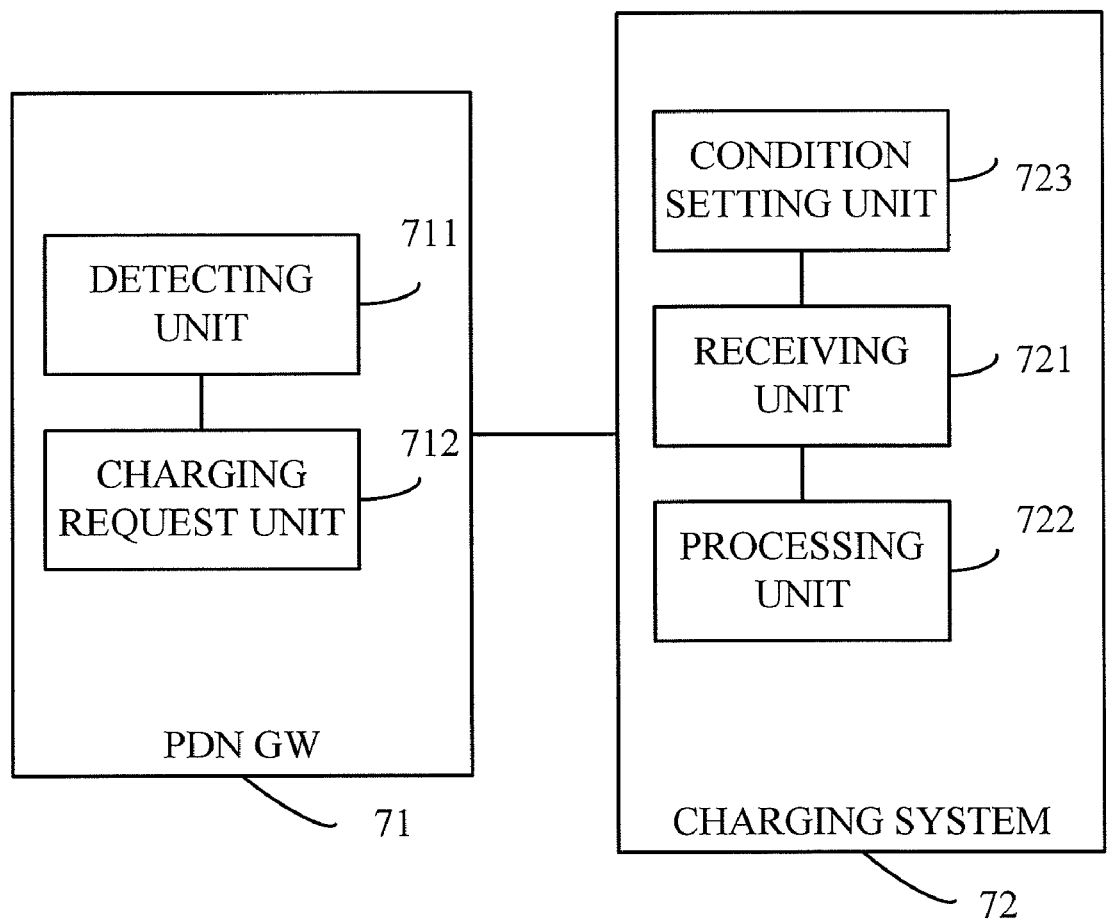
FIG. 5 is a block diagram of a network system according to an embodiment of the present invention.

Referring to FIG. 5, a block diagram of a network system architecture according to an embodiment of the present invention is illustrated.

The network system illustrated in FIG. 5 includes a PDN GW 71 and a charging system 72.

The PDN GW 71 is configured to send a charging request containing the type of a second method for the user equipment to access the PDN GW 71 after the PDN GW 71 detects that the method for the user equipment to access the PDN GW 71 is changed from a first method to the second method.

The charging system 72 is configured to receive the charging request sent by the PDN GW 71. According to the charging request, the charging system 72 performs charging control over the used service units in a charging mode corresponding to the first method for the user equipment to access the PDN GW 71 and reserves service units for the charging session for the second method based on a charging mode corresponding to the second method for the user equipment to access the PDN GW 71.

FIG. 5 illustrates a structure of the PDN GW 71. The PDN GW 71 includes a detecting unit 711 and a charging request unit 712.

The detecting unit 711 is configured to monitor if there is any change in the method for the UE to access the PDN GW 71. The detecting unit 711 acquires from the charging system 72 a newly added condition for triggering the charging request and monitors based on the acquired condition if there is any change in the method for the UE to access the PDN GW 71. The newly added condition is that the method for the user equipment to access the packet data network changes. Detecting, by the detecting unit 711, that the method for the user equipment to access the PDN GW 71 has been changed from the first method to the second method includes detecting that the wireless access method has been changed and/or the serving node has been changed, wherein the user equipment connects to the PDN GW 71 via the Serving Node. The Serving Node is a Serving GW or an ePDG.

The charging request unit 712 is configured to send to the charging system 72 a charging request containing the type of the second method for the user equipment to access the PDN GW 71 after the detecting unit 711 detects that the method for the user equipment to access the PDN GW 71 has been changed from the first method to the second method. The charging request sent by the charging request unit 712 to the charging system 72 further includes used service units in a charging mode corresponding to the first method for the user equipment to access the PDN GW 71 and/or the requested service units in a charging mode corresponding to the second method for the user equipment to access the PDN GW 71.

A structure of the charging system 72 is also illustrated in FIG. 5. The charging system 72 includes a receiving unit 721 and a processing unit 722.

The receiving unit 721 is configured to receive the charging request sent by the PDN GW 71, which contains the type of the second method for the user equipment to access the PDN GW 71.

The processing unit 722 is configured to perform, based on the charging request received by the receiving unit 721, charging control over the used service units in a charging mode corresponding to the first method for the user equipment to access the PDN GW 71 and reserves service units for the charging session for the second method based on a charging mode corresponding to the second method for the user equipment to access the PDN GW 71.

The charging system 72 further includes a condition setting unit 723 configured to add a new condition for triggering the charging request and send the condition to the PDN GW 71, wherein the added condition is that the method for the user equipment to access the PDN GW 71 changes.

Overall, according to the conventional art, charging control in the case of different access techniques is performed separately with different charging architectures. When a handover of the access method is performed, the charging continuity during the handover of the access method cannot be achieved. However, the technical solutions according to the embodiments of the present invention take full advantage of the centralized control functions of the PDN GW and utilize the PDN GW to detect if the method for the UE to access the PDN GW has been changed. When it is detected that the method for the UE to access the PDN GW has been changed from a first method to a second method, the charging system sends a charging request containing a type of the second method. The charging system performs, based on the charging request, charging control over the used service units in a charging mode corresponding to the first method for the UE to access the PDN GW and reserves service units for the charging session for the second method based on the charging mode corresponding to the second method for the UE to access the PDN GW. Therefore, charging continuity during the handover of the method for the UE to access the PDN GW can be achieved.

Further, the charging process method according to embodiments of the present invention may be applicable to both the online charging system (OCS) and the offline charging system. In the case that the method is applied to the OCS, when it is detected that the method for the UE to access the PDN GW has been changed from the first method to the second method, the charging request sent to the charging system may contain a type of the second method for the UE to access the PDN GW, the used service units in a charging mode corresponding to the first method and/or the requested service unit in a charging mode corresponding to the second method, and the time when the first method is changed to the second method. As a result, the charging process can be more refined and accurate.

The above description is directed to a charging process method according to an embodiment of the present invention, a network system and a charging system thereof. It is appreciated by a person with ordinary skill in the art that modifications may be made to the specific implementation of the embodiments and the application fields in accordance with the spirit and principle of the embodiments of the present invention. Therefore, the Specification shall not be construed as a limitation to the scope of the present invention.

What is claimed is:

1. A charging process method, comprising:
receiving, from a charging system by a packet data network gateway, a condition for triggering a charging request, the condition for triggering the charging request comprises that a method for a user equipment to access a packet data network gateway changes;
monitoring, by the packet data network gateway, if there is any change in the method for a user equipment to access the packet data network gateway; and
sending, by the packet data network gateway, to the charging system the charging request containing a type of a second method for the user equipment to access the packet data network gateway when detecting that the method for the user equipment to access the packet data network gateway has been changed from a first method to the second method.

2. The method of claim 1, wherein monitoring if there is any change in a method for a user equipment to access a packet data network gateway comprises:
detecting at least one of a change in a wireless access method and a change in a serving node through which the user equipment accesses the packet data network gateway.

3. The method of claim 2, wherein:
the change in the wireless access method includes a handover among a Wireless Local Area Network, an Evolved UMTS Terrestrial Wireless Access Network and a second generation mobile communication network/a third generation mobile communication network; and
the serving node through which the user equipment accesses the packet data network gateway comprises a serving gateway or an evolved packet data gateway.

4. The method of claim 3, further comprising:
sending, by the packet data network gateway, an initial charging request to the charging system, the initial charging request including at least one of: a type of the first method for the user equipment to access the packet data network gateway and requested service units in the case of the first method for the user equipment to access the packet data network gateway;
wherein the condition for triggering the charging request is contained in an initial charging request answer sent from the charging system.

5. The method of claim 3, wherein the charging request further comprises at least one of:
used service units in a first charging mode corresponding to the first method for the user equipment to access the packet data network gateway;
requested service units in a second charging mode corresponding to the second method for the user equipment to access the packet data network gateway; and
a handover time when the method for the user equipment to access the packet data network gateway is switched from the first method to the second method.

6. A charging process method, comprising:
sending, by a charging system, a condition for triggering a charging request to a packet data network gateway, the condition comprises that a method for a user equipment to access a packet data network gateway changes;
receiving, by a charging system from a packet data network gateway, the charging request containing a type of a second method for the user equipment to access the packet data network gateway when the method for a user equipment to access the packet data network gateway has been changed from a first method to the second method; and
performing, by the charging system, based on the charging request, charging control over used service units in a first charging mode corresponding to the first method for the user equipment to access the packet data network gateway, and reserving, by the charging system, service units for a service in the case of the second method for the user equipment to access the packet data network gateway based on a second charging mode corresponding to the second method for the user equipment to access the packet data network gateway.

7. The method of claim 6, wherein a method for a user equipment to access a packet data network changes comprises at least one of:
a change in a wireless access method, and a change in a serving node through which the user equipment accesses the packet data network gateway.

8. The method of claim 7, wherein:
the change in the wireless access method includes a handover among a Wireless Local Area Network, an Evolved UMTS Terrestrial Wireless Access Network and a second generation mobile communication network/a third generation mobile communication network; and
the serving node through which the user equipment accesses the packet data network gateway comprises a serving gateway or an evolved packet data gateway.

9. The method of claim 8, wherein before sending the condition for triggering the charging request contained to the packet data network gateway, the method further comprises:
receiving, by the charging system, an initial charging request from the packet data network gateway, the initial charging request including at least one of: a type of the first method for the user equipment to access the packet data network gateway and requested service units in the case of the first method for the user equipment to access the packet data network gateway;

wherein the condition for triggering the charging request sent to the packet data network gateway is contained in an initial charging request answer sent to the packet data network gateway.

10. The method of claim 8, wherein the received charging request further comprises requested service units in a second charging mode corresponding to the second method for the user equipment to access the packet data network gateway; and wherein reserving the service units for a service in the case of the second method for the user equipment to access the packet data network gateway based on a second charging mode corresponding to the second method for the user equipment to access the packet data network gateway comprises:

reserving the service units for the service in the case of the second method for the user equipment to access the packet data network gateway based on a second charging mode corresponding to the second method for the user equipment to access the packet data network gateway according to the requested service units in the received charging request.

11. The method of claim 10, wherein the received charging request further comprises a handover time when the method for the user equipment to access the packet data network gateway is switched from the first method to the second method;

wherein performing charging control over the used service units in the first charging mode corresponding to the first method for the user equipment to access the packet data network gateway is based on a reference point according to the handover time.

12. The method of claim 8, further comprises:
converting, by the charging system, the services units from the first charging mode to the second charging mode based on the rating, if the first charging mode corresponding to the first method for the user equipment to access the packet data network gateway is different from the second charging mode corresponding to the second method for the user equipment to access the packet data network gateway.

13. The method of claim 12, wherein:
the first charging mode comprises at least one of: a flow-based mode, a time-based mode and an event-based mode;
the second charging mode comprises at least one of: a flow-based mode, a time-based mode and an event-based mode.

14. The method of claim 10, further comprising:
allocating service units for the service in the case of the first method for the user equipment to access the packet data network gateway when receiving the initial charging request from the packet data network gateway;
wherein performing charging control over the used service units in the first charging mode corresponding to the first method for the user equipment to access the packet data network gateway comprises: compensating the user equipment if the used service units in the first charging mode corresponding to the first method for the user equipment to access the packet data network gateway is less than the allocated service units to the service; and
wherein reserving the service units for the service in the case of the second method for the user equipment to access the packet data network gateway according to the requested service units comprises:
determining service units to be allocated for the service in the case of the second method for the user equipment to access the packet data network gateway based on the requested service units in the received charging request, the used service units in the case of the first method for the user equipment to access the packet data network gateway, and account balance associated with the user equipment in a data base.

15. A network system, comprising:
a packet data network gateway, configured to acquire a newly added condition for triggering a charging request and to monitor based on the acquired condition if there is any change in a method for a user equipment to access a packet data network gateway; send the charging request containing a type of a second method for a user equipment to access the packet data network gateway after the packet data network gateway detects that the method for the user equipment to access the packet data network gateway is changed from a first method to the second method; wherein the newly added condition for triggering the charging request comprises the method for the user equipment to access the packet data network changes; and
a charging system, configured to add the new condition for triggering the charging request; send the new condition for triggering the charging request to the packet data network gateway; receive the charging request sent by the packet data network gateway; perform, according to the charging request, charging control over used service units in a first charging mode corresponding to the first method for the user equipment to access the packet data network gateway; and reserve service units for a service in the case of the second method based on a second charging mode corresponding to the second method for the user equipment to access the packet data network gateway.

16. The network system of claim 15, wherein the method for the user equipment to access the packet data network gateway is changed from a first method to the second method comprises at least one of:
a change in a wireless access method, the change in a wireless access method includes a handover among a Wireless Local Area Network, an Evolved UMTS Terrestrial Wireless Access Network and a second generation mobile communication network/a third generation mobile communication network; and
a change in a serving node through which the user equipment accesses the packet data network gateway, the serving node comprises a serving gateway or an evolved packet data gateway.

17. The network system of claim 16, wherein:
the charging request sent by the charging request unit to the charging system further comprises requested service units in the second charging mode corresponding to the second method for the user equipment to access the packet data network gateway; and
the charging system comprises:
a condition setting unit, configured to add a new condition for triggering the charging request and send the new condition for triggering the charging request to the packet data network gateway; the new condition comprises the method for the user equipment to access the packet data network gateway changes;
a receiving unit, configured to receive the charging request sent by the packet data network gateway; and a processing unit, configured to perform, based on the charging request received by the receiving unit, charging control over the used service units in the first charging mode corresponding to the first method for the user equipment to access the packet data network gateway and to reserve service units for the service in the case of the second method for the user equipment to access the packet data network gateway based on the second charging mode corresponding to the second method for the user equipment to access the packet data network gateway according to the requested service units.

* * * * *